(12) United States Patent
Tanaka et al.

(10) Patent No.: US 6,288,462 B1
(45) Date of Patent: Sep. 11, 2001

(54) STATOR OF ALTERNATING CURRENT GENERATOR

(75) Inventors: Kazunori Tanaka; Yoshihito Asao; Kyoko Higashino, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/639,843

(22) Filed: Aug. 16, 2000

(30) Foreign Application Priority Data

Feb. 14, 2000 (JP) .............................................. 2000-035503

(51) Int. Cl.[7] .......................... H02K 15/00; H02K 11/00; H02K 3/04; H02K 1/12
(52) U.S. Cl. ............................ 310/71; 310/208; 310/254; 310/42
(58) Field of Search .............................. 310/189, 71, 179, 310/68 R, 66, 200, 208, 195, 180, 257, 254, 42

(56) References Cited

U.S. PATENT DOCUMENTS

| | | | |
|---|---|---|---|
| 4,954,734 | 9/1990 | Iguchi et al. | 310/71 |
| 5,006,765 | * 4/1991 | Schmider | 310/71 |
| 5,808,387 | * 9/1998 | Akachi et al. | 310/54 |

FOREIGN PATENT DOCUMENTS

| | | |
|---|---|---|
| 0 751 609 | 1/1997 | (EP) . |
| 0 881 752 | 12/1998 | (EP) . |
| 0 923 187 | 6/1999 | (EP) . |
| 0 978 927 | 2/2000 | (EP) . |
| Hei 7-32555 | 4/1995 | (JP) . |
| Hei 7-115743 | 5/1995 | (JP) . |

OTHER PUBLICATIONS

XP–002159163.
XP–002159164.
European Search Report dated Feb. 27, 2001.

* cited by examiner

Primary Examiner—Nestor Ramirez
Assistant Examiner—Guillermo Perez
(74) Attorney, Agent, or Firm—Sughrue, Mion, Zinn, Macpeak & Seas, PLLC (57) ABSTRACT

A conductor of a stator coil 18 is formed of oxygen free copper and the conductor end acting as a neutral point of the stator coil 18 is protruded from a coil end portion 18*b* and the tip end of the conductor end is bonded from above by arc welding to configure a neutral connection portion 20.

7 Claims, 7 Drawing Sheets

PRIOR ART

STATOR OF ALTERNATING CURRENT GENERATOR

BACKGROUND OF THE INVENTION

This invention relates to a stator of an alternating current generator.

Figure 11:
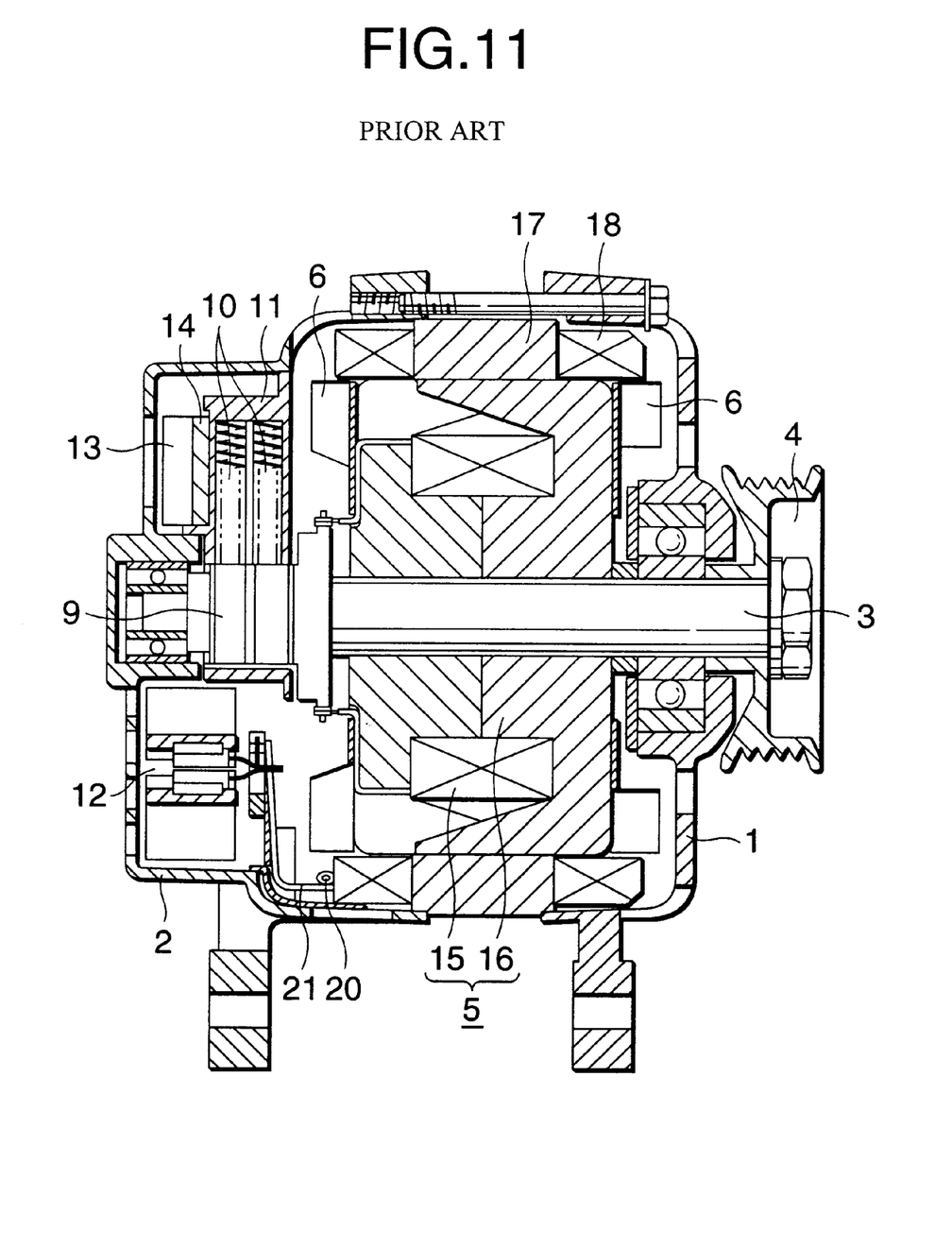
FIG. 11 is a sectional view showing a conventional alternating current generator of this type.

FIG. 11 is a sectional view showing a conventional alternating current generator. In the drawing, numerals 1 and 2 are a front bracket and a rear bracket made of aluminum constituting a case of the generator, and numeral 3 is a shaft provided inside the case and one end of the shaft is fixed in a pulley 4, and numeral 5 is a rotor of lundel-type fixed in the shaft 3, and numeral 6 is fans fixed in both sides of the rotor 5, and numeral 8 is a stator fixed in an inner wall of the case, and numeral 9 is a slip ring fixed in the other end (the opposite side of the end in which the pulley 4 is fixed) of the shaft 3 and the slip ring supplies a current to the rotor 5, and numeral 10 is a pair of brushes for sliding on the slip ring 9, and numeral 11 is a brush holder for receiving the brushes 10, and numeral 12 is a commutator electrically connected to the stator 8 and the commutator commutates alternating current output generated in the stator 8 into direct current output, and numeral 13 is a heat sink fixed in the brush holder 11, and numeral 14 is a regulator bonded to the heat sink 13 and the regulator controls an alternating current output voltage from the stator 8.

The rotor 5 comprises a rotor coil 15 for generating a magnetic flux by the flow of a current and pole cores 16 which sandwich the rotor coil 15 and form magnetic poles by the magnetic flux, and the pole cores 16 comprise a pair of a first pole core body and a second pole core body with the bodies engaging alternately.

The stator 8 comprises a stator core 17 and a stator coil 18 in which a conductor is wound on the stator core 17 and an alternating current voltage is generated by a change in the magnetic flux from the rotor coil 15 with rotation of the rotor 5.

In the alternating current generator shown in FIG. 11, by supplying a current from a battery (not shown) to the rotor coil 15 through the brushes 10 and the slip ring 9, the magnetic flux is generated and the first pole core body is magnetized in a north pole and the second pole core body is magnetized in a south pole. On the other hand, the pulley 4 is driven by an engine (not shown) and the rotor 5 rotates with the shaft 3 and thereby, a rotating magnetic field generated in the pole cores 16 is given to the stator coil 18 and an alternating current voltage is generated in the stator coil 18 by electromagnetic induction. The alternating current output generated in the stator coil 18 is commutated into direct current by the commutator 12 and also is controlled by the regulator 14 and is charged to the battery.

Figure 12:
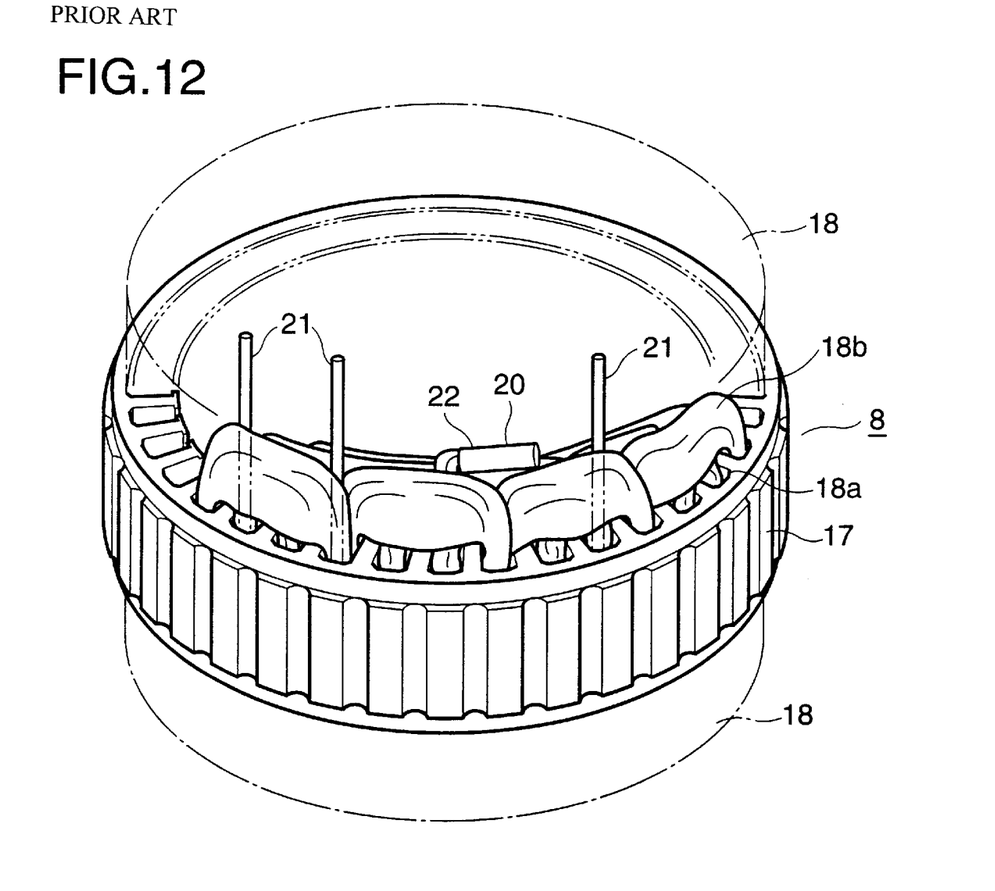
FIG. 12 is a perspective view showing a stator of the conventional alternating current generator.
Figure 13:
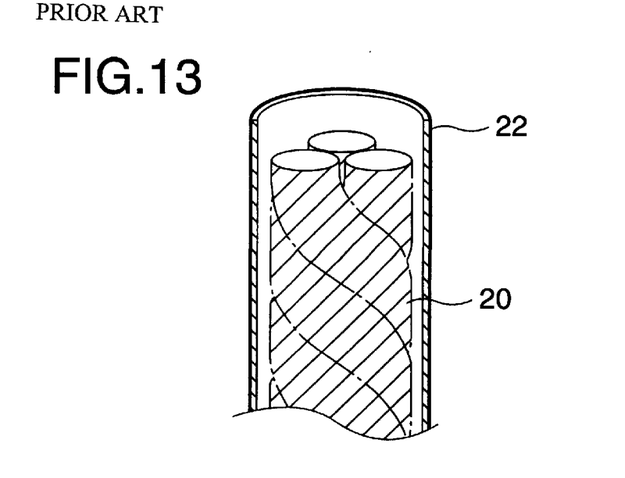
FIG. 13 is a perspective view showing a structure of a neutral connection portion of the stator of the conventional alternating current generator.

FIG. 12 is an enlarged perspective view of the stator of the alternating current generator shown in FIG. 11, and FIG. 13 is a detail view showing a structure of a neutral connection portion of the stator of FIG. 12.

A conductor constituting the stator coil 18 of the stator 8 is formed of a round conductor and comprises a receiving portion 18a received inside slots formed in the stator core 17 and a coil end portion 18b protruding to both sides of the stator core 17. Also, when the stator coil 18 is connected in a star in order to configure a circuit of a three-phase alternating current generator, a neutral connection portion 20 is formed in order to couple three conductor ends to make a neutral point and further output lines for sending the alternating current output generated in the stator coil 18 to the commutator 12 are included. Also, in order to recover output from a neutral voltage generated in the neutral point, an output outgoing line may be together coupled to the neutral connection portion 20 and in this case, four conductor ends are connected at the neutral connection portion 20.

Tough pitch copper is used in a conductor of the stator coil 18 and conventionally, the neutral connection portion 20 is bonded by soldering. Also, the soldered neutral connection portion 20 is coated with an insulating tube 22 and is inclined to the side of the coil end portion 18b in order to improve resistance to vibration and is fixed by varnish through the insulating tube 22.

Also, as a method of neutral connection, a method for fixing conductor ends using a bundling member and contacting to couple a different type of metal with good conductivity to the conductor end surface is disclosed in the Unexamined Japanese Patent Application No. Hei 7-115743.

The neutral connection portion of the stator of the conventional alternating current generator is configured as described above, and when solder is used as a bonding member of the neutral connection portion 20, there was a problem that a bonded portion is opened due to heat deterioration. Also, when Pb-containing solder is used in order to improve heat resistance of the solder, there were an environmental problem and a problem of a decrease in workability associated with an increase in melting point of the bonding member. Further, since a solidification shape is not stable in the solder, there is a possibility that a problem occurs in insertion into the insulating tube 22. Furthermore, for bonding using the solder, connection resistance increases due to deterioration of the solder, so that there was a problem that an increase in temperature of the bonded portion is accelerated and deterioration of the bonded portion is promoted.

Moreover, since bond strength is low in the bonding using the solder, a large area of the solder bonded portion is required and also, for fastening to a coil end portion, an insulating tube is always necessary for insulation and there was a problem that fastening strength is low in the fastening through the insulating tube.

Also, as a method of neutral connection, methods such as fusing and swaging have been proposed, but there was a problem of increase in a part count since a "terminal" to be used as a connection medium is required in any case and further, there was a problem of increase in a part kind since a terminal for connection corresponding to a sectional area of a conductor is required in order to bundle several conductors. Further, when the terminal is connected as a medium, a size of outer diameter of a neutral connection portion includes a thickness of the terminal, so that the diameter of the neutral connection portion increases and accordingly a diameter of the insulating tube to be fitted for insulation of a connection portion also increases, with the result that there was a problem that the conductors in the vicinity of the connection portion inside the insulating tube are difficult to fix and hold.

SUMMARY OF THE INVENTION

The invention is implemented to overcome such problems, and it is an object of the invention to obtain a stator of an alternating current generator having a neutral connection portion with high reliability capable of improving bonding workability of the neutral connection portion.

A stator of an alternating current generator according to the invention comprises: a stator core having plural slots, a stator coil in which conductors are wound in the slots, and a neutral connection portion of the stator coil provided in a coil end portion formed in one end of the stator core, and plural conductor ends acting as a neutral point of the stator coil are bundled in the neutral connection portion and each of the conductor ends is substantially engaged with at least other plural conductor ends to be bonded by arc welding and a melt bonded portion of the neutral connection portion is formed in a substantially hemispherical shape in which the side of the bonded conductor ends is a base.

Also, the melt bonded portion by the arc welding of the neutral connection portion has a base area larger than or equal to the total sectional area of conductors to be bonded.

Further, plural conductors constituting the neutral connection portion are bonded by the arc welding with the conductors twisted.

Furthermore, solder coating is applied to the neutral connection portion after bonding.

Moreover, the melt bonded portion of the neutral connection portion is fastened to a stator coil end portion by resin.

Also, the stator of the alternating current Generator comprises a stator core having plural slots, a stator coil in which conductors whose cross section is a flat shape are wound in the slots, and a neutral connection portion of the stator coil provided in a coil end portion formed in one end of the stator core, and plural conductor ends acting as a neutral point of the stator coil are bundled in the neutral connection portion and each of the conductor ends is substantially engaged in line in a plane portion of the conductor ends to be bonded by arc welding and a melt bonded portion of the neutral connection portion is formed in a substantially hemispherical shape in which the side of the bonded conductor ends is a base and is fastened to a stator coil end portion by resin.

Further, the conductor of the stator coil is formed of oxygen free copper.

DETAILED DESCRIPTION OF THE PREFERRED EMBODIMENTS (First Embodiment)

Figure 1:
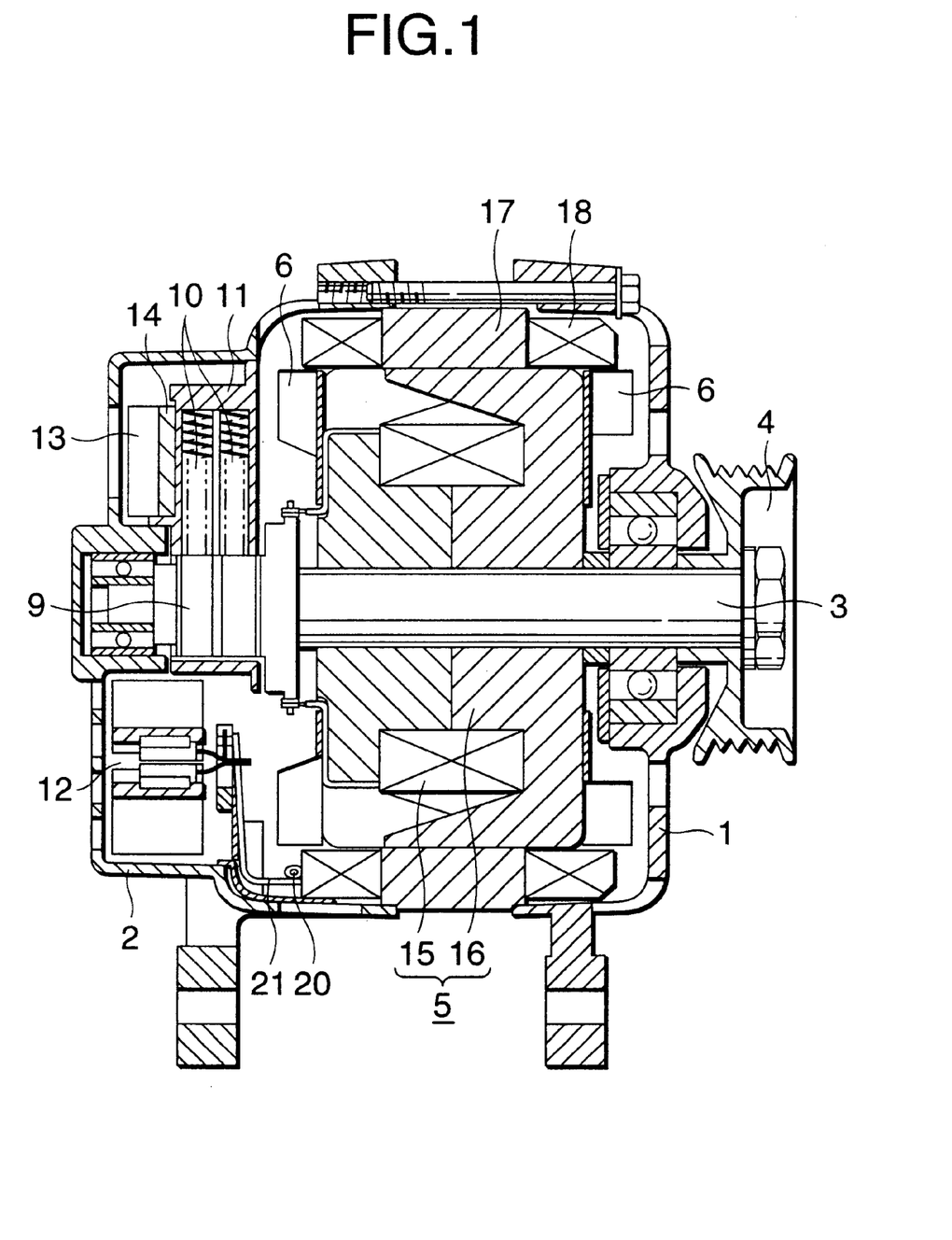
FIG. 1 is a sectional view showing an alternating current generator mounting a stator according to a first embodiment of this invention.
Figure 2:
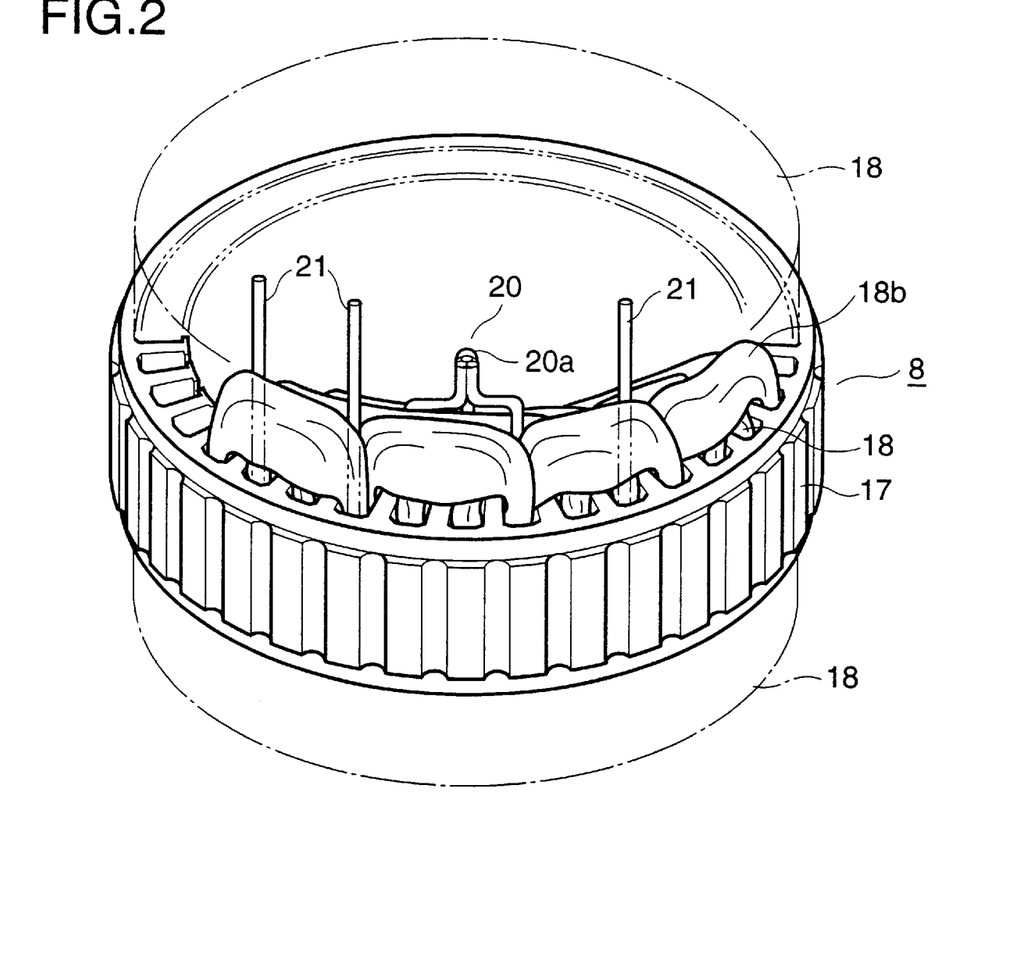
FIG. 2 is a perspective view showing the stator of the alternating current generator according to the first embodiment of the invention.
Figure 3:
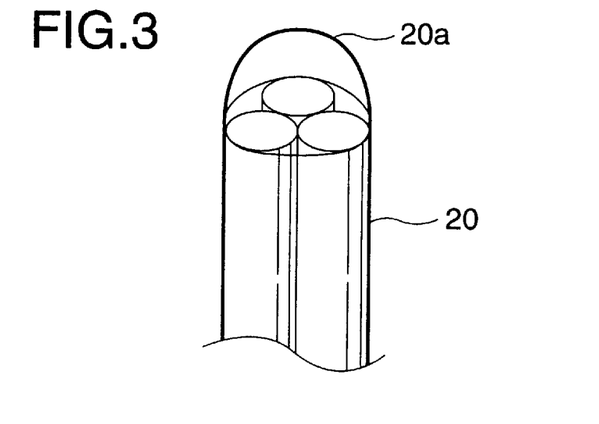
FIG. 3 is a perspective view showing a structure of a neutral connection portion of the stator of the alternating current generator according to the first embodiment of the invention.

A stator of an alternating current generator according to one embodiment of the invention will be described with reference to the accompanying drawings below. FIG. 1 is a sectional view showing the alternating current generator mounting the stator according to a first embodiment of the invention, and FIG. 2 is an enlarged perspective view of the stator of the alternating current generator shown in FIG. 1, and FIG. 3 is an enlarged perspective view showing a structure of a neutral connection portion of the stator shown in FIG. 2.

In the drawings, numerals 1 and 2 are a front bracket and a rear bracket made of aluminum constituting a case of the generator, and numeral 3 is a shaft provided inside the case and one end or the shaft is fixed in a pulley 4. Numeral 5 is a rotor of lundel-type fixed in the shaft 3 and the rotor comprises a rotor coil 15 for generating a magnetic flux by the flow of a current and pole cores 16 which sandwich the rotor coil 15 and form magnetic poles by the magnetic flux. Numeral 6 is fans fixed in both sides of the rotor 5. Numeral 8 is a stator fixed in an inner wall of the case and the stator comprises a stator core 17 and a stator coil 18 in which a conductor is wound on the stator core 17 and an alternating current voltage is generated by a change in the magnetic flux from the rotor coil 15 with rotation of the rotor 5.

Numeral 9 is a slip ring fixed in the other end (the opposite side of the end in which the pulley 4 is fixed) of the shaft 3 and the slip ring supplies a current to the rotor 5, and numeral 10 is a pair of brushes for sliding on the slip ring 9, and numeral 11 is a brush holder for receiving the brushes 10, and numeral 12 is a commutator electrically connected to the stator 8 and the commutator commutates alternating current output generated in the stator 8 into direct current output, and numeral 13 is a heat sink fixed in the brush holder 11, and numeral 14 is a regulator bonded to the heat sink 13 and the regulator controls an alternating current output voltage from the stator 8.

Numeral 20 is a neutral connection portion of the stator coil 18 of the stator 8, and numeral 20a is a melt bonded portion of the neutral connection portion 20, and numeral 21 is an output line for sending alternating current output generated in the stator coil 18 to the commutator 12.

Also, the stator coil 18 of the stator 8 has a receiving portion 18a received inside slots formed in the stator core 17 and a coil end portion 18b protruding to both sides of the stator core 17.

Incidentally, a structure other than a portion of the stator coil 18 and operations of the generator are similar to that of a conventional alternating current generator.

In the stator 8 of the alternating current generator according to the present embodiment, a conductor of the stator coil 18 is formed of oxygen free copper and the conductor end acting as a neutral point of the stator coil 18 is protruded from the coil end portion 18b and the tip side of the conductor end is bonded from above by arc welding. A shape of the melt bonded portion 20a of the neutral connection portion 20 is formed in a substantially hemispherical shape and a base area of the melt bonded portion 20a can ensure the area larger than or equal to the total sectional area of plural conductors to be bonded.

According to the embodiment, by forming the conductor of the stator coil 18 of oxygen free copper and bonding the neutral connection portion 20 by arc welding, occurrence of water vapor due to reduction of contained oxides occurring in the case of using tough pitch copper in the conductor is prevented and occurrence of blowholes inside the melt bonded portion 20a due to intergranular crack resulted from the occurrence of water vapor can be prevented and also, the melt bonded portion 20a of the neutral connection portion 20 becomes the hemispherical shape, so that stress concentration does not occur in the bonded portion and bond strength of the neutral connection portion 20 can be improved. As a result of that, there is no need for fastening operation or an insulating tube in order to improve resistance to vibration of the neutral connection portion 20.

While an increase in connection resistance of the neutral connection portion 20 due to deterioration occurring in the case of using solder as a bonding member and an increase in temperature associated with the increase in connection resistance are not found, the connection resistance of the neutral connection portion 20 can be reduced since the base area of the melt bonded portion 20a is larger than the total sectional area of plural conductors to be bonded.

(Second Embodiment)

Figure 4:
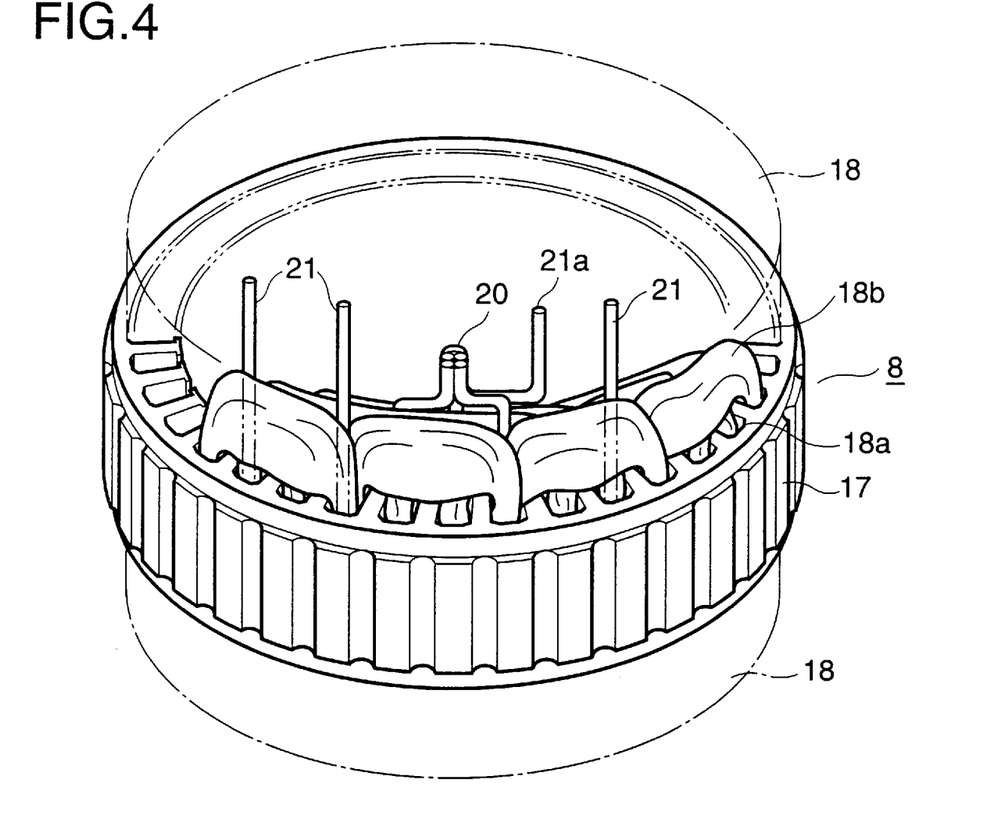
FIG. 4 is a perspective view showing a stator of an alternating current generator according to a second embodiment of the invention.
Figure 5:
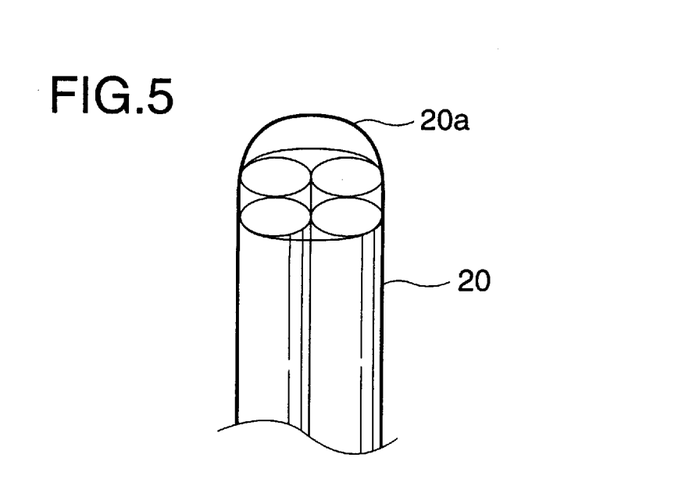
FIG. 5 is a perspective view showing a structure of a neutral connection portion of the stator of the alternating current generator according to the second embodiment of the invention.

FIG. 4 is an enlarged perspective view showing a stator of an alternating current generator according to a second embodiment of the invention, and FIG. 5 is an enlarged perspective view showing a structure of a neutral connection portion of the stator shown in FIG. 4. In the drawings, numeral 21a is an output line for sending output generated in a neutral point to a commutator 12. Incidentally, a description will be omitted since other configuration is similar to that of the first embodiment.

In the embodiment, in order to recover the output generated in the neutral point, four conductor ends are connected at a neutral connection portion 20.

According to the embodiment, effect similar to the first embodiment can be obtained even when four or more conductors are connected at the neutral connection portion 20.

(Third Embodiment)

Figure 6:
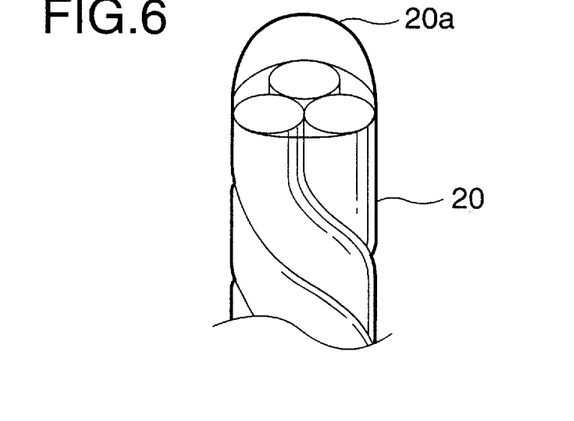
FIG. 6 is a perspective view showing a structure of a neutral connection portion of a stator of an alternating current generator according to a third embodiment of the invention.

FIG. 6 is an enlarged perspective view showing a structure of a neutral connection portion of a stator of an alternating current generator according to a third embodiment of the invention. Incidentally, a description will be omitted since a configuration other than a neutral connection portion 20 is similar to that of the first embodiment.

In the embodiment, welding is performed after conductors to be welded are twisted and fixed when the neutral connection portion 20 is welded.

According to the embodiment, while effect similar to the first embodiment can be obtained, a presser jig in welding is eliminated and bond strength can be improved.

(Fourth Embodiment)

Figure 7:
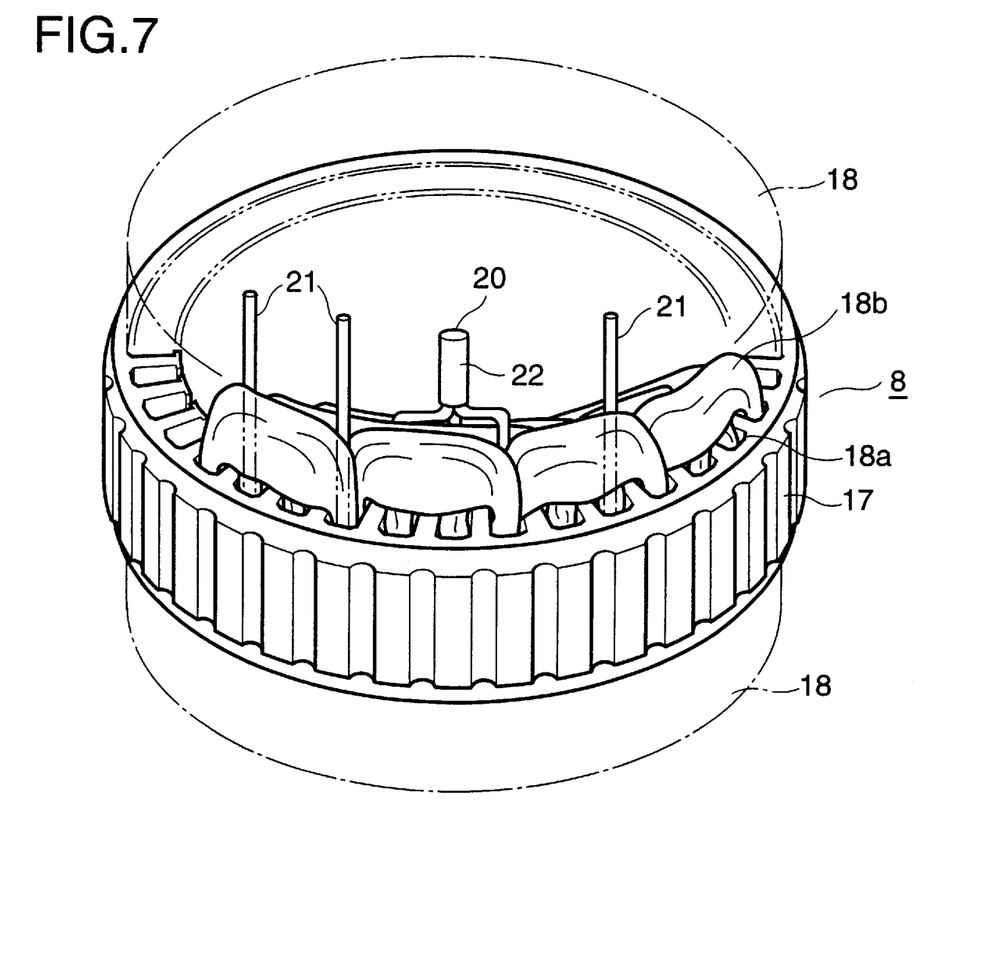
FIG. 7 is a perspective view showing a stator of an alternating current generator according to a fourth embodiment of the invention.
Figure 8:
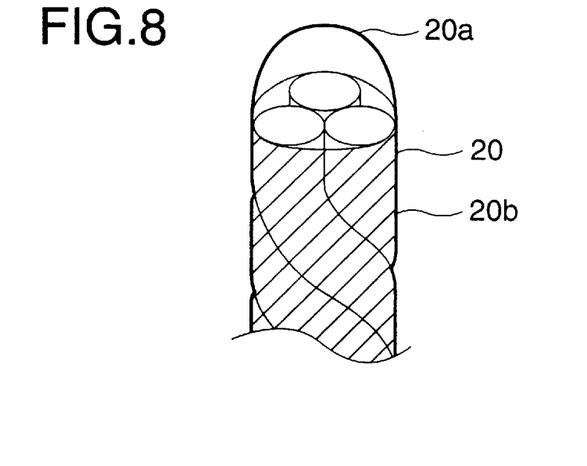
FIG. 8 is a perspective view showing a structure of a neutral connection portion of the stator of the alternating current generator according to the fourth embodiment of the invention.

FIG. 7 is an enlarged perspective view showing a stator of an alternating current generator according to a fourth embodiment of the invention, and FIG. 8 is an enlarged perspective view showing a structure of a neutral connection portion of the stator shown in FIG. 7. In the drawings, numeral 20b is solder coating applied to the periphery of a neutral connection portion 20 and numeral 22 is an insulating tube covering the neutral connection portion 20. Incidentally, a description will be omitted since other configuration is similar to that of the first or third embodiment.

In the embodiment, after welding the neutral connection portion 20, the solder coating 20b is applied to the periphery of the connection portion and the periphery is covered with the insulating tube 22. Also, after the periphery is covered with the insulating tube 22, the neutral connection portion 20 may be fastened to a coil end portion 18b by resin.

Incidentally, a structure of the neutral connection portion 20 may be any structures shown in the first to third embodiments.

According to the embodiment, while effect similar to the first, second or third embodiment can be obtained, corrosion resistance can be improved by applying the solder coating 20b to the neutral connection portion 20 and reliability of the connection portion can be improved.

Incidentally, the solder is used in the embodiment, but there is particularly no problem since there is a small amount of use of the solder by only the coating.

Also, the tip end of a melt bonded portion 20a is formed in a spherical shape, so that insertion of the neutral connection portion 20 into the insulating tube 22 is facilitated.

(Fifth Embodiment)

Figure 9:
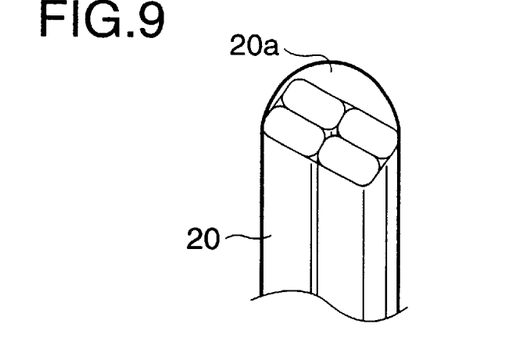
FIG. 9 is a perspective view showing a structure of a neutral connection portion of a stator of an alternating current generator according to a fifth embodiment of the invention.

Though a round conductor is used as a conductor constituting a stator coil 18 in the first embodiment, effect similar to the first embodiment can be obtained by using a conductor whose cross section is a flat shape as a conductor constituting the stator coil 18 as shown in FIG. 9 and also, bond strength of a neutral connection portion 20 can be more improved since the surfaces of the flat conductors engage in the neutral connection portion 20.

(Sixth Embodiment)

Figure 10:
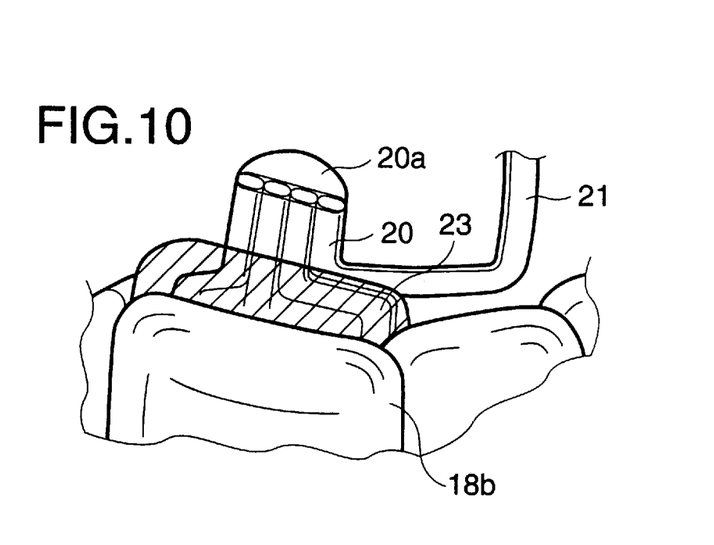
FIG. 10 is a perspective view showing a part of a stator of an alternating current generator according to a sixth embodiment of the invention.

FIG. 10 is an enlarged perspective view showing a part of a stator of an alternating current generator according to a sixth embodiment of the invention. In the drawing, numeral 23 is resin for fastening a neutral connection portion 20. Incidentally, a description will be omitted since other configuration is similar to that of the first embodiment.

In the embodiment, a conductor whose cross section is a flat shape is used as a conductor constituting a stator coil 18 and in the neutral connection portion 20, the surfaces of the flat conductors are engaged and bonded in line by arc welding and then, the neutral connection portion 20 is fastened to a coil end portion 18b by resin 23.

According to the embodiment, while effect similar to the first embodiment can be obtained, space saving and resistance to vibration can be more improved since the surfaces of the flat conductors are engaged and bonded in line and the fastening is performed using the resin 23.

According to the invention as described above, in a stator of an alternating current generator, by forming a conductor of a stator coil of oxygen free copper and bonding a neutral connection portion using arc welding, occurrence of blowholes inside a melt bonded portion can be prevented and also, the melt bonded portion becomes the hemispherical shape and stress concentration does not occur in the bonded portion, so that bond strength of the neutral connection portion can be improved, with the result that there is no need for fastening operation or an insulating tube in order to improve resistance to vibration of the neutral connection portion and workability of the neutral connection portion can be improved.

Also, connection resistance of the neutral connection portion can be reduced since a base area of the melt bonded portion of a neutral point is larger than the total sectional area of plural conductors to be bonded.

Further, the connection portion with high reliability can be configured even in the case of three or more conductors to be connected at the neutral point.

Also, by Welding is performed after conductors to be welded are twisted and fixed when the neutral connection portion is welded, a presser jig in welding is eliminated and bond strength can be improved.

Further, by applying solder coating to the periphery of the connection portion after welding the neutral connection portion, corrosion resistance of the connection portion can be improved.

Furthermore, by using a conductor whose cross section is a flat shape as a conductor constituting a stator coil and engaging the surfaces of the flat conductors and bonding in line and fastening the neutral connection portion to a coil end portion using resin in the neutral connection portion, space saving and resistance to vibration can be improved.

What is claimed is:

1. A stator of an alternating current generator, comprising:
   a stator core having a plurality of slots;
   a stator coil having a plurality of conductors wherein the conductors are wound in the slots; and
   a neutral connection portion of said stator coil provided in a coil end portion formed in one end of said stator core, wherein
      a plurality of conductor ends acting as a neutral point of said stator coil are bundled in said neutral connection portion and each of the conductor ends is substantially engaged with at least one other of the plurality of conductor ends the conductor ends being bonded by arc welding such that a melt bonded portion of said neutral connection portion is formed in a substantially hemispherical shape in which the side of the bonded conductor ends end in a base.

2. The stator of an alternating current generator as defined in claim 1, wherein
   the melt bonded portion of said neutral connection portion has a base area larger than or equal to the total sectional area of the bonded conductors.

3. The stator of an alternating current generator as defined in claim 1, wherein
   the plurality of conductors constituting said neutral connection portion are bonded together by arc welding with the conductors twisted.

4. The stator of an alternating current generator as defined in claim 1, wherein
   a solder coating is applied to said neutral connection portion after bonding.

5. The stator of an alternating current generator as defined in claim 4, wherein
   the melt bonded portion of said neutral connection portion is fastened to a stator coil end portion by resin.

6. The stator of an alternating current generator as defined in claim 1, wherein
   the conductors of said stator coil are formed of oxygen free copper.

7. A stator of an alternating current generator, comprising:
   a stator core having a plurality of slots;
   a stator coil having a plurality of conductors the cross section of said conductors having a flat shape wherein the conductors are wound in the slots; and
   a neutral connection portion of said stator coil provided in a coil end portion formed in one end of said stator core, wherein
      a plurality of conductor ends acting as a neutral point of said stator coil are bundled in said neutral connection portion and each of the conductor ends is substantially engaged with the others of said plurality of conductor ends, in line with a lateral plane portion of the conductor ends, the conductor ends being bonded by arc welding such that a melt bonded portion of said neutral connection portion is formed in a substantially hemispherical shape in which the side of the bonded conductor ends end in a base and the neutral connection portion is fastened to a stator coil end portion by resin.

* * * * *